Dec. 2, 1958 L. W. PRYOR 2,862,419

REAR VIEW MIRROR

Filed Dec. 22, 1954

INVENTOR
Lucien W. Pryor
BY
J. E. Ross
ATTORNEY

United States Patent Office 2,862,419
Patented Dec. 2, 1958

2,862,419
REAR VIEW MIRROR

Lucien W. Pryor, Anderson, Ind., assignor to General Motors Corporation, Detroit, Mich., a corporation of Delaware Application December 22, 1954, Serial No. 477,068

4 Claims. (Cl. 88—98)

This invention relates to rear view mirrors for vehicles and more particularly, to that type which facilitates mirror adjustment and locking by the operator of the vehicle.

A rear view mirror must be angularly adjustable to permit positioning in accordance with operating conditions and the individual characteristics of the operator for selection of the desired field of view. In order to minimize the effort and attention required of the vehicle operator, the rear view mirror must be easily adjustable to the desired inclination and resistant to accidental deflection by vibration, shock, wind or other forces.

Accordingly, it is an object of this invention to provide a rear view mirror which may be angularly adjusted and which may be frictionally locked in position to avoid accidental displacement.

It is another object of this invention to provide a rear vision mirror which may be frictionally locked in angular position by simple rotation of the mirror housing.

It is a further object to provide a rear view mirror having an adjusting and locking means entirely concealed from view to thereby enhance the appearance and permit styling in accordance with that of the vehicle.

These and other objects and the manner in which they are achieved will become apparent from the description which follows taken with the accompanying drawings in which.

This invention comprises means for pivotally mounting a mirror housing member on a support bracket member and includes coupling means seated in one of said members and having a threaded shank engaging threaded means non-rotatably mounted on the other of said members. Stop means are provided to prevent relative rotation between the coupling means and the member in which it is seated. Pivotal movement is permitted between the coupling means and the said one member and the two may be frictionally locked together by relative rotation of the members about the axis of the threaded shank.

Figure 1:
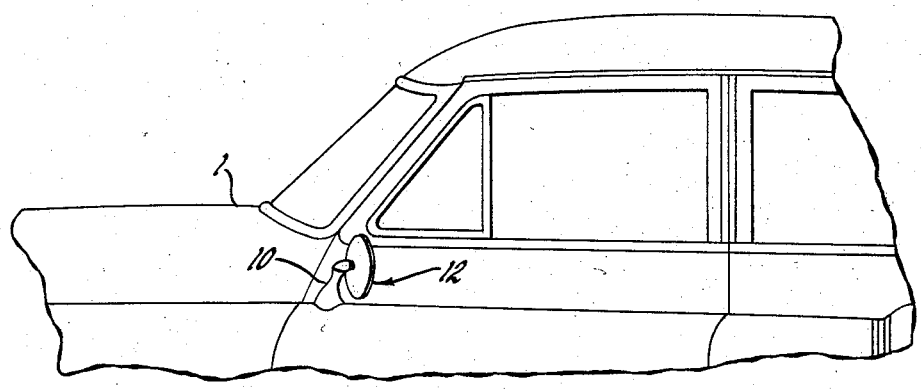
Figure 1 represents a typical installation of the inventive rear view mirror on a motor vehicle.
Figure 2:
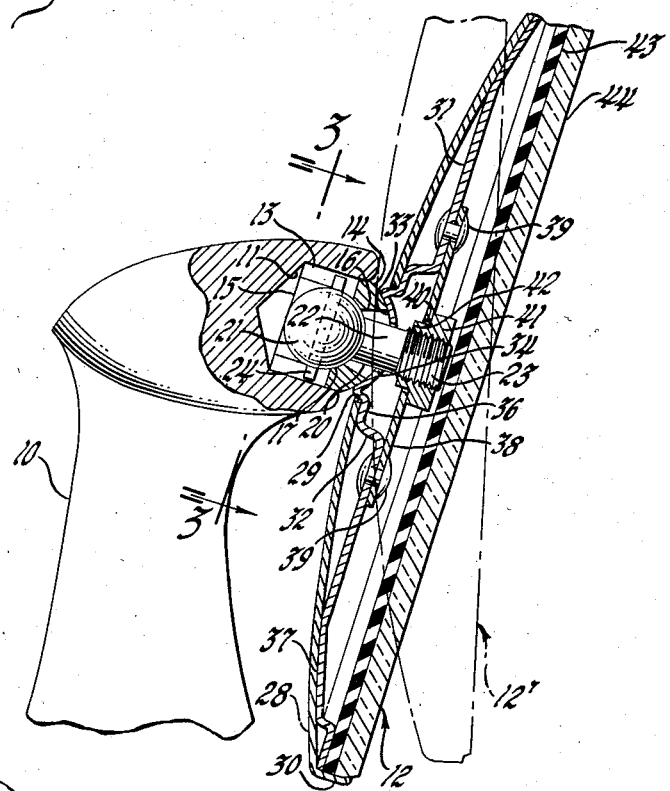
Figure 2 is a sectional view of the adjusting and locking mechanism.
Figure 3:
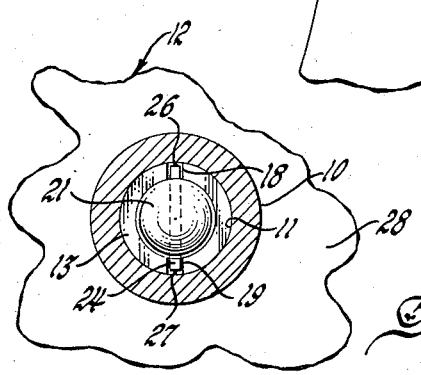
Figure 3 is a fragmentary view taken on line 3—3 of Figure 2.

Referring now to the drawings, in Figure 1 there is shown a typical installation on a passenger car vehicle 1 of a rear view mirror assembly comprising a mirror supporting bracket 10 and a mirror housing 12. The rear view mirror assembly is affixed to the vehicle body by backet 10 at a position to afford the operator a suitable field of view and to permit manipulation of the mirror housing 12 for adjustment and locking. The embodiment of the invention in an outside mounted rear view mirror assembly for passenger vehicles is presented for illustration only; it will be apparent that it is also applicable to inside mounted mirror assemblies.

The supporting bracket 10, suitably of die cast metal, is provided at its outer end with an axially extending opening 11. A bushing member 13 extending outwardly from bracket 10 is pressed-fitted into the opening 11 and terminates at its outer end in a spherical bearing surface 14. The bushing member 13 defines a tapered axial passage 16 which terminates in an interiorly disposed spherical socket 17 concentric with bearing surface 14. Axially extending, oppositely disposed slots 18 and 19 extend from the socket 17 to the inner end 15 of bushing member 13. The bushing member 13 and the support bracket 10 constitute support means for the mirror housing 12, as will appear subsequently.

A ball stud 20 is provided as coupling means to pivotally connect the mirror housing 12 to the bushing member 13 and hence to the support bracket 10 and includes a spherical member or ball 21 seated in the spherical socket 17. Extending outwardly from an integral connection with the ball 21 through the tapered passage 16 is a shank or stud member 22 terminating in a threaded portion 23, preferably having a right hand thread. The shank 22 is permitted pivotal motion within the confines of the passage 16 about the center of the ball 21. A pin member 24 has end projections 26 and 27 extending into slots 18 and 19, respectively, to prevent rotation of the ball stud 20 about the longitudinal axis of the shank 22.

A mirror housing 12 is mounted on shank 22 for pivotal motion therewith to permit angular adjustment. The housing 12 includes a mirror body or cover plate 28 which, in the illustrative embodiment, is generally circular and somewhat dish-shaped. The cover plate 28 defines a central opening 29 and is provided at its peripheral edge with a flange 30. A reinforcing member or plate 31 is provided with a centrally located, shouldered boss 32 defining a spherical socket 33 and opening 34 in alignment with central opening 29 in cover plate 28. The reinforcing plate 31 is seated against the cover plate 28 at the annular shoulder 36 of boss 32 and at the annular bearing portion 37. A support plate 38 is secured to reinforcing plate 31 by any suitable means such as rivets 39 and defines centrally located, rectangular opening 40 in alignment with passage 16 and opening 34, through which the threaded shank 22 extends. A clinch nut 41 is non-rotatably mounted on support plate 38 by means of a rectangular shoulder 42 extending into the rectangular opening 40. The clinch nut 41 engages the threaded portion 23 of shank 22 for securing the mirror housing 12 to the ball stud 20. A backing plate 43 of resilient material such as sponge rubber is seated against reinforcing plate 31 and supports a mirror 44 disposed within the flange 30 of the cover plate 28. The flange 30 is crimped over the mirror 44 to secure the reinforcing plate, backing plate and mirror thereto.

It will now be apparent that the clinch nut 41 may be advanced or retracted axially of threaded shank 22 by rotation of mirror housing 12. Clockwise rotation of the housing is effective to advance the nut 41 causing the socket 33 to react against spherical bearing surface 14 and the ball 21 to be urged into engagement with socket 17. In this condition the ball stud 20 and mirror housing 12 are locked in position with respect to bushing member 13 by reason of the frictional engagement of ball 21 and socket 33 therewith. Unlocking or loosening of these parts is obviously effected by counterclockwise rotation of housing 12 to retract the clinch nut 41.

In operation, the mirror 44 may be adjusted and locked in a desired angular position by a simple manipulation of the housing 12. Assume, for example, that the mirror housing is initially locked in the position of housing 12 (as shown in uninterrupted lines) and it is desired to lock the mirror housing in the alternate position of housing 12' (as shown in dashed lines). In order to unlock the mirror from its initial position, the mirror housing is rotated counterclockwise about the axis of threaded shank 22, The projections 26 and 27 in slots 18 and 19, respectively, prevent rotation of the shank 22 and the nut 41 is retracted. In this condition the mirror housing is freely pivotable with shank 22 within the limits of the tapered passage 16. Once the desired angular inclination is established the mirror housing 12 is merely rotated in a clockwise direction to advance the nut 41 on shank 22 urging the ball 21 into engagement with socket 17 and the socket 33 into engagement with the bearing surface 14 to frictionally lock the ball stud 20 to the bushing member 13.

It will now be appreciated that adjustment of the inventive mirror requires a minimum of effort from the operator and when locked in position is not subject to accidental displacement. The entire adjusting and locking mechanism is concealed within the bracket member and the mirror housing, permitting the greatest freedom in the design to achieve a pleasing appearance.

Although the invention has been described with respect to a particular embodiment, this embodiment is illustrative only and is not to be construed in a limiting sense. Numerous modifications and variations within the spirit and scope of the invention will now occur to those skilled in the art. For a definition of the invention, reference is made to the appended claims.

I claim:

1. A rear view mirror comprising a supporting bracket having an opening therein, a bushing member press-fitted into the opening of said support bracket in frictional engagement therewith and defining a passage terminating at its inner end in a spherical socket at its outer end in a spherical socket bearing element, a ball in said socket and a threaded shank extending from said ball and through said passage, stop means on said ball and said support means to prevent relative rotation therebetween about the axis of said shank, a mirror housing including a spherical socket bearing element engaging said spherical socket bearing element on the bushing member, a mirror supported by the housing, and threaded means non-rotatably mounted on said housing in threaded engagement with said shank whereby said ball and socket may be frictionally locked by rotation of said housing.

2. A rear view mirror comprising support means defining an axial passage terminating at one end in a spherical socket, at the other end in a spherical socket bearing element, a ball in said spherical socket and a threaded shank extending from said ball and through said passage, said support means defining an axially extending slot adjacent one side of said ball, a radial pin-like projection extending from said ball and operatively fitting said slot to prevent relative axial rotation between said threaded shank and said support means, a mirror housing including a spherical socket bearing element engaging said spherical socket bearing element on the support means, a mirror supported by the housing, and a nut non-rotatably secured to said housing in threaded engagement with said threaded shank whereby said ball and socket may be frictionally locked by rotation of said housing.

3. A rear view mirror comprising a support bracket having an opening therein, a bushing member in said opening and having an axial passage terminating in a spherical socket, a ball in said socket and a threaded shank extending from said ball through said passage, said bushing defining oppositely disposed, axially extending slots, a pin extending diametrically through said ball into said slots to prevent relative axial rotation between said ball and said bushing member, a mirror housing including a spherical socket bearing portion engaging said bushing member, a mirror supported by the housing, and a nut non-rotatably secured to said housing in threaded engagement with said threaded shank whereby said ball and socket may be frictionally locked by rotation of said housing.

4. In combination, a supporting bracket defining an axially extending opening, a bushing member frictionally retained in said opening and extending outwardly from said bracket and defining an axially extending tapered passage terminating at its inner end in a spherical socket, said bushing member having an outer end provided with a spherical surface concentric with said socket, a ball seated in said socket, a threaded stud integrally connected with said ball and extending through said tapered passage, said bushing member defining a pair of oppositely disposed axially extending slots, a pin extending diametrically through said ball into said slots, a mirror housing including a cover plate defining a central opening, a mirror supported by the housing, a reinforcing plate having a central boss defining a spherical socket therein, said boss extending through said central opening into engagement with the outer end of said bushing member, and a threaded nut non-rotatably mounted on said mirror housing in alignment with said central opening in threaded engagement with said stud whereby said housing may be frictionally locked in angular position by rotation of said housing about the axis of said threaded stud.

References Cited in the file of this patent

UNITED STATES PATENTS

| | | |
|---|---|---|
| 1,703,704 | Anzell | Feb. 26, 1929 |
| 1,796,093 | Florman | Mar. 10, 1931 |
| 1,934,223 | Booth | Nov. 7, 1933 |
| 1,973,847 | Orlow et al. | Sept. 18, 1934 |
| 2,069,890 | MacDuff | Feb. 9, 1937 |